July 7, 1964    C. M. L. L. BOURCIER DE CARBON    3,140,085
SHOCK ABSORBERS
Filed Jan. 15, 1962                                           3 Sheets-Sheet 1
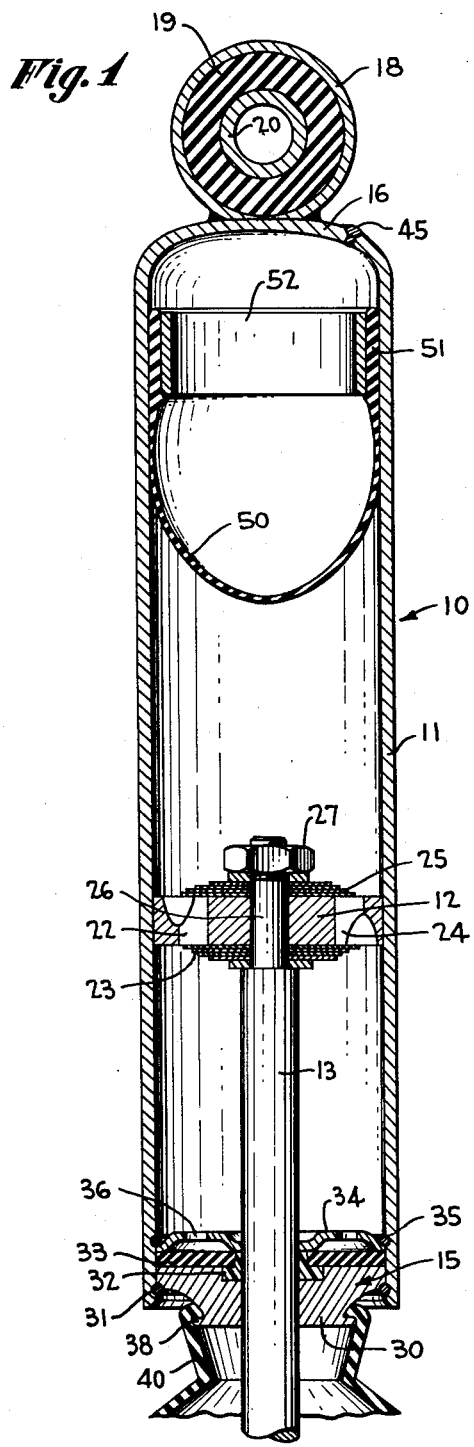
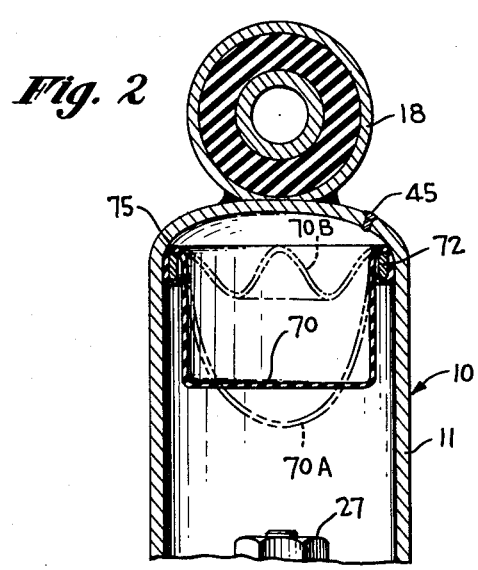
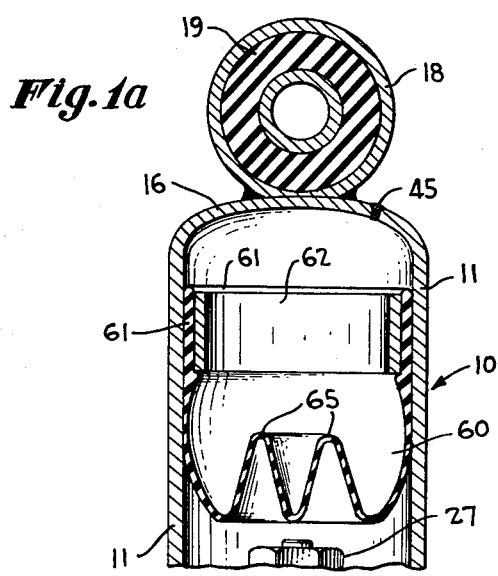
C.M.L.L. BOURCIER DE CARBON
INVENTOR.
BY *Watson, Cole, Grindle & Watson*
ATTORNEYS July 7, 1964  C. M. L. L. BOURCIER DE CARBON  3,140,085
SHOCK ABSORBERS
Filed Jan. 15, 1962  3 Sheets-Sheet 2

C.M.L.L. BOURCIER DE CARBON
INVENTOR.

BY *Watson, Cole, Grindle & Watson*

ATTORNEYS

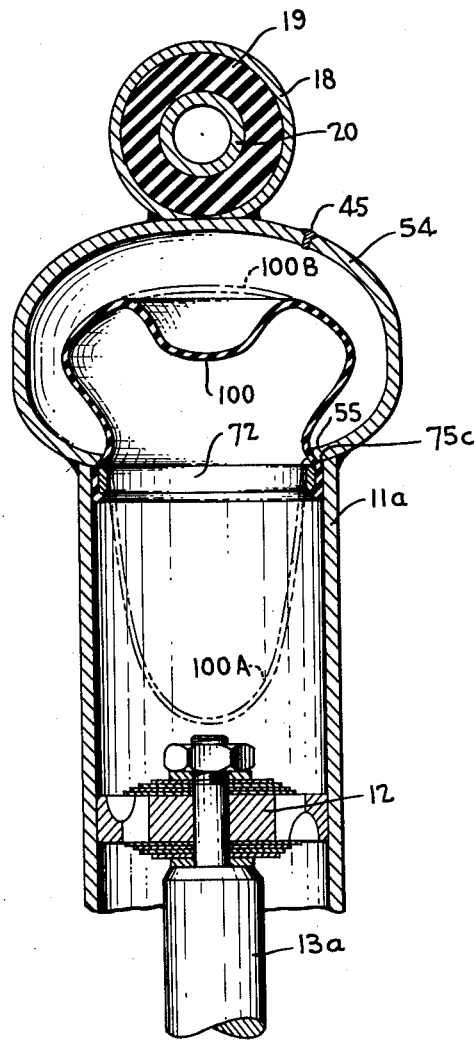

United States Patent Office 3,140,085
Patented July 7, 1964

3,140,085
SHOCK ABSORBERS
Christian Marie Lucien Louis Bourcier de Carbon,
64 Blvd. Maurice-Barres, Neuilly-sur-Seine, France
Filed Jan. 15, 1962, Ser. No. 166,145
Claims priority, application France Feb. 14, 1961
2 Claims. (Cl. 267—64)

This invention relates to shock absorbers of the direct-acting hydro-pneumatic telescoping piston-and-cylinder type, and more particularly to means for compensating for the displacement of damping fluid by the successive entry of portions of the piston rod into the cylinder upon occurrence of the compression stroke.

In applicant's prior United States Patent 2,774,446 there is disclosed a pressurized hydraulic shock absorber in which a piston rod compensation chamber is provided at one end of the shock absorber cylinder and is filled with a gas under several atmospheres of pressure, which exerts an equivalent high pressure upon the body of damping liquid. In the case of that patent and also of the application filed November 7, 1960, jointly in the names of the present applicant and John E. Heckethorn, Serial No. 67,784, now Patent No. 3,101,131, there is employed for the effective separation of the damping liquid and the pressure gas, a floating piston member. In the latter disclosure, the packing or sealing of the floating piston is accomplished by an O-ring of rubber or equivalent synthetic material, and provision is made for minimizing wear on the O-ring packing by providing for a rolling movement thereof for the greater portion of the floating movement of the piston as during travel on the average smooth highway.

For some installations, however, it has been found that the use of a flexible diaphragm with a fixed periphery offers certain advantages over the floating piston separator. It is therefore the general object of the present invention to provide a novel and improved flexible diaphragm separator for use in hydro-pneumatic shock absorbers of the general type described.

Some advantages over previous constructions may be mentioned as follows: All friction in the area of the separation of the fluids is eliminated, which should result in a somewhat improved ride as compared with use of shock absorbers having a tightly compressed O-ring packing arrangement, especially during excessive piston movements beyond the rolling ambit of the O-ring.

Even slight scoring of the internal wall surface of the tube or cylinder cannot be tolerated in the O-ring installation. Efforts to prevent this become unnecessary in the case of the flexible diaphragm arrangement since there is no relative movement at the periphery of the diaphragm.

The cost of providing a diaphragm of appropriate material together with its associated clamping means would be somewhat less than that of a floating piston and O-ring device.

In a floating piston construction, the end of the piston rod can collide with the floating piston if a small quantity of oil or other damping liquid is lost either through the piston seal or past the O-ring into the pressure chamber. With the use of a flexible diaphragm, such loss of oil would be less significant.

More specific objects and features of novelty, including simple and ingenious means for installing the diaphragm, will be apparent from the following specification when read in connection with the accompanying drawings in which several embodiments of the invention are illustrated by way of example.

In the drawings:
FIGURE 1 is a view in vertical axial section through a shock absorber embodying the principles of the invention, the parts being shown in extended position as upon the rebound stroke when in use in connection with a motor vehicle spring suspension;

FIGURE 1a is a fragmentary view similar to the upper portion of FIGURE 1 showing the parts in contracted condition as on the compression stroke, with the gas under increased pressure and the diaphragm flexed or collapsed upwardly;

FIGURE 2 is a view similar to FIGURE 1a or the upper portion of FIGURE 1, illustrating another embodiment of the invention, the diaphragm being shown in three different positions;

FIGURE 7 is a similar vertical sectional view through a shock absorber of increased diameter and having a piston rod of such a diameter that the piston rod displacement pressure is so great that it can be employed as one of the spring suspension means for a vehicle to which the device may be applied.

Figure 5:
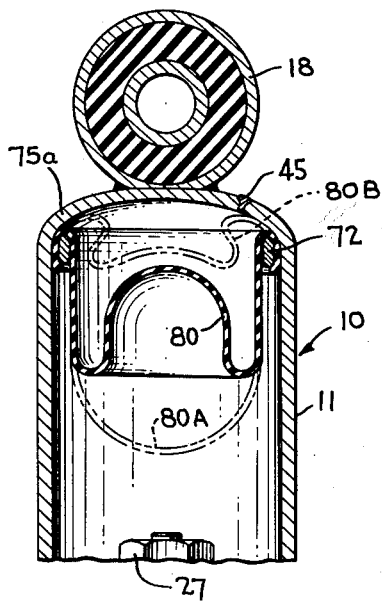
FIGURE 5 is a vertical sectional view similar to FIGURE 2 but showing still another form of diaphragm in several positions during operation.

The shock absorber 10 shown in FIGURES 1 and 1a of the drawings comprises essentially the cylinder 11, the piston 12, and the piston rod 13, the last named element passing through the lower end of the cylinder and being packed by means of the packing or seal assembly indicated generally by the reference numeral 15.

Secured to the upper rounded end portion 16 of the cylinder 11 is the attaching eye 18 into which the rubber grommet 19 and the inner bushing 20 are inserted. A similar securing means is of course provided at the lower end of the piston rod 13 as in the conventional installation.

The piston 12 is provided with one or more passageways providing for the flow of liquid in opposite directions during the reciprocating movements of the piston. Upon the upward or compression stroke of the piston, the greater portion of the fluid being by-passed flows through the passageway 22 and is controlled by the disc valve arrangement 23. Upon extension or rebound movement of the piston the bulk of the fluid transferred from one portion of the cylinder to the other passes through the passageway 24, the flow being controlled by the disc valving 25.

The piston 12 and the valving 23 and 25 are secured upon the attenuated end portion 26 of the piston rod 13 as by means of the nut 27.

The packing arrangement 15 does not form an essential feature in the novelty of the present invention and may be of any suitable construction, for example along the lines of some of the applicant's prior applications. It is sufficient to state that the outer plate member 30 is secured within the lower open end of the cylinder or tube 11 by means of the snap ring 31 and has its upper surface recessed to accommodate the sealing member 32 which is urged radially inwardly toward the rod 13 by means of the washer 33 which is made of rubber or synthetic elastomeric material. An inner plate 34 completes the sandwich comprising the sealing installation and is secured in place by means of the snap ring 35. The damping fluid under pressure may penetrate through the openings 36 in the plate 35 and exert pressure in an axial direction against the surface of the washer 33 and thus increase its radially inward pressure against the seal member 32.

A peripheral flange 38 may be formed on the outer plate 30 for the retention of the upper end portion of the rubber boot or bellows 40 which serves to protect the rod 13 from abrasion by foreign particles.

Through an opening in the upper end of the cylinder 11, which is sealed by the plug 45, a pressure gas such as nitrogen may be injected. In order to separate the body of damping liquid through which the piston oscillates, from the pressure gas, there is provided a bulbous or globular diaphragm 50 which may be made of rubber or a suitable synthetic elastomeric material, preferably molded from Neoprene or Buna-N reinforced by nylon. The diaphragm 50 takes the form generally of the finger of a glove and the peripheral neck portion 51 may be slightly thickened as indicated in the drawings and is pressed firmly against the inner wall of the cylinder 11 by means of the inserted ring or collar 52 which may be of metal or relatively rigid plastic material. The diaphragm 50 of course should be made of a material which is not sensitive to the action of the oil contained in the main portion of the cylinder which is impermeable with respect to the gas used, which has a long flexing life and which retains its flexibility and resistance to cracking at temperatures down to say —40° F. Neoprene is a long-chain synthetic rubber made by the polymerization of chloroprene (monochloro-butadiene $H_2CCClCHCH_2$). Buna-N is a synthetic rubber produced by the co-polymerization of butadiene and acrylonitrile.

The ring 52 can either be applied against the inner face of the neck of the diaphragm or embedded in the wall of the latter portion. Before being applied to the interior of the cylinder the neck 51 of the diaphragm should be of slightly greater diameter than the inside diameter of the cylinder 11 so that when it is installed it is clamped firmly against the wall of the cylinder.

In installing the diaphragm the following procedure may be followed: The diaphragm 50 together with its retaining ring 52 is first introduced through the lower open end of the cylinder and moved upwardly therein to its desired position. The piston is then inserted and the desired amount of oil or other damping liquid is introduced into the cylinder. The sealing assembly 15 for the piston rod is then installed and finally gas is introduced under pressure through the orifice which is ultimately closed by the plug 45. The pressurizing of the shock absorber may be pursued by means of the apparatus and method disclosed in the co-pending application of John E. Heckethorn, Serial No. 17,961, filed March 28, 1960, now Patent No. 3,081,587.

In FIGURE 1a of the drawings there is illustrated a slightly modified embodiment of the diaphragm. The basic parts of the shock absorber are given the same reference numerals as in FIGURE 1. The diaphragm in this case is indicated at 60 and has a thickened neck portion 61 retained by the ring or collar 62, just as in the case of the earlier described embodiment. However, the lower bulbous portion of the diaphragm 60 is molded with concentric undulations indicated at 65 which render the alternating deformations of the diaphragm particularly easy.

In the embodiment illustrated in FIGURE 2 of the drawings the basic structure of the shock absorber is given the same reference characters and the diaphragm itself is indicated at 70. In this form the diaphragm has the configuration of a cylindrical cup and when under compression by the upward movement of the piston, may assume the crumpled or undulatory form indicated at 70B. Upon substantial downward movement of the piston, however, the diaphragm may be drawn out somewhat to assume the more rounded conical form indicated at 70A.

For retaining this particular diaphragm, a slightly different means is provided. The retaining sleeve or collar 72 presses the neck or lip portion of the diaphragm against the inner side walls of the cylinder 11 with the body of the diaphragm extending upwardly from the collar 72 and thence downwardly within the collar, thus forming a loop or doubled flange enveloping the retaining ring or collar 72.

In this embodiment also the curving upper end portion of the cylinder 11 serves as an abutment for determining the position of the diaphragm and retaining collar, as at the point 75.

In installing this diaphragm the following steps would be taken. First, the margins of the flexible diaphragm are disposed around the retaining ring and then the diaphragm member is placed into an assembly fixture which may simply be a tapered or funnel-like guide sleeve or ring through which a tubular plunger may work. The plunger would then force the diaphragm and ring member through the tapered sleeve and into the shock absorber cylinder forcing it all the way to the end of the cylinder, at the same time exerting radially inward compression on the member. During this movement air contained within the cylinder would escape through the pressurizing orifice which is eventually closed by the plug 45.

Then the correct amount of oil would be introduced beneath the diaphragm and the piston and piston rod inserted. The seal and rod guide assembly would be installed and fixed in its final position. The pressure chamber would then be evacuated, pressurized to the proper degree, and the seal plug 45 resistance-welded into place.

Figure 3:
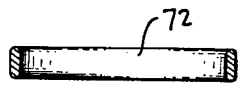
FIGURE 3 is a detail view in vertical section of one form of retaining ring for securing the diaphragm in place.
Figure 4:
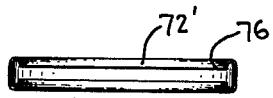
FIGURE 4 is a similar view of another embodiment of the retaining ring.

In FIGURE 3 there is shown a suitable retaining ring 72 which may be forged, die cast, or made from machined tubing. The ring 72' illustrated in FIGURE 4 can be formed by rolling or stamping and could be fabricated from strip stock without difficulty. The edges of the ring could be rolled into an inturned position as indicated at 76 in order to stiffen the structure. Of course, the differences between the cylinder inside diameter and the outside diameter of the retaining ring would be such as to apply a substantial squeezing action to the peripheral portion of the diaphragm. It would also be possible to serrate the outer surface of these rings for increased gripping action, but it would be advisable to make these serrations well rounded to prevent premature fracturing of the rubber material.

The pressing of the diaphragm assembly against the upper end portion of the cylinder as at 75 serves to prevent the assembly from tipping or being displaced during installation and operation.

In FIGURE 5 another embodiment of diaphragm is illustrated at 80 in its relaxed condition and would appear as indicated at 80A when the shock absorber is in extended condition with the piston in a lower point. At 80B there is illustrated the approximate configuration of the diaphragm upon occurrence of the compression stroke when the confined gas is under maximum pressure. The retaining ring indicated at 82 may take any suitable form including those illustrated in FIGURES 3 and 4 of the drawings. In this embodiment the recessed pocket in the diaphragm is formed with generous radiuses in order to prevent fatigue cracking.

Figure 6:
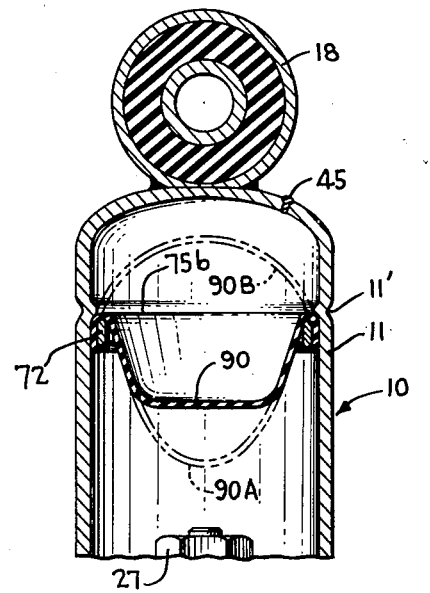
FIGURE 6 is a similar view of a further variation in the diaphragm provided.

In FIGURE 6 of the drawings the cylinder 11 of the shock absorber 10 has a groove 11' rolled therein which results in an annular protrusion or ridge 75b which serves as an abutment to limit the upward position of the diaphragm employed in this case which is indicated generally by the reference numeral 90. At 90A and 90B are respectively indicated the approximate position and configuration of the diaphragm 90 under extension and contraction conditions. The annular margin or lip portion of the diaphragm 90 is wrapped around the retaining ring 72 as in the case of the other embodiments.

In FIGURE 7 of the drawings there is illustrated a variation which is particularly adapted to be employed in the case of large sized reciprocating piston-and-cylinder shock absorbers which are designed to afford sufficient piston rod force to supply at least a part of the spring suspension function for the vehicle. An arrangement of this type may in some cases be employed as a combined shock absorber and helper spring for trucks, station wagons, or ordinary passenger cars subject to varying heavy loadings. The cylinder 11a in this case is provided with a separately formed bulbous or domelike head casing 54 to which the connecting parts 18-20 are welded. The head or casing 54 is Sigma-welded to the upper end of the tubular portion 11 as at 55 and the margins of the bottom opening of the casing, indicated at 55, extend inwardly beyond the inner diameter of the main cylinder portion 11a to provide an abutment 75c for the diaphragm 100, the neck or peripheral portions of which are wrapped around the retaining ring 72 as in the case of the other embodiments. The diaphragm is shown at 100A and 100B in the extension and contraction positions respectively.

In this particular embodiment the diameter of the piston rod 13a is considerably increased over that shown in the other embodiments and thus results in a very considerable increase in compression of the gas above the diaphragm 100. To absorb the substantially increased volume of hydraulic damping liquid brought about by the larger piston rod cross-section, the enlarged pressure chamber within the dome casing 54 is required.

It is quite important to attain a maximum diaphragm area in relation to the piston rod cross-sectional area. If the diaphragm is molded to take advantage of the larger expansion dome cross-section, the life expectancy of the diaphragm will be excellent, and this is the configuration suggested in FIGURE 7. Although the extreme inward position of the diaphragm is suggested at 100A, this would not represent a normal position in most cases during ordinary travel. The diaphragm 100 would remain substantially within the expansion chamber enclosed by the head casing 54, most of the time.

It will be realized that by the frictional compressional retention of the peripheries of the diaphragms disclosed herein, the installation is effected in most cases without any extensive modifications in the cylinder construction, such as would be involved by clamping the diaphragm between separate sections of the cylinder which might involve spinning, flanging, bolting, or other expensive operations.

It is understood that various changes and modifications may be made in the embodiments illustrated and described herein without departing from the scope of the invention as defined by the following claims.

Having thus described the invention, what is claimed as new and desired to be secured by Letters Patent is:

1. A hydro-pneumatic shock absorber of the direct-acting cylinder-and-piston type, comprising a tubular cylinder member having an integral wall at one end and terminating in an opposite cylindrical open end structure, a piston disposed for reciprocation within said cylinder member and having a piston rod projecting through said open end, a rod-packing closure means extending across the open end structure of said cylinder member and provided with a central opening receiving the reciprocating rod, a quantity of damping liquid in said cylinder member through which the piston moves during compression and extension of the shock absorber, a quantity of gaseous fluid under pressure in said cylinder at the integral end portion thereof, the entry of successive portions of the piston rod during the compression stroke displacing an equivalent volume of damping liquid and resulting in a proportionate increase in the pressure to which said gaseous fluid is subjected, and a diaphragm member having a generally circular periphery and an impervious continuous body within said periphery, said diaphragm member extending transversely across said cylinder member at a point spaced axially from said integral end wall, the inner wall surface of the cylinder member being smooth and uninterrupted and of a substantially uniform diameter from that point to the open end of the cylinder, said diaphragm member serving to separate the damping liquid from the compressed gaseous fluid, a marginal portion of said diaphragm being conformed to a cylindrical configuration and lying snugly against a portion of the inner wall of the cylinder member, a relatively rigid ring disposed radially inwardly of said cylindrical marginal portion of said diaphragm and serving to press said marginal portion against the inner wall of the cylinder member to seal the periphery of the diaphragm against said wall, said body of the diaphragm member having a reverse bend around said ring and extending toward the open end of the cylinder member beyond said ring in the form of a cupped portion when the shock absorber is in an idle unstressed condition, the outer diameter of the diaphragm and ring assembly being substantially equal to the inner diameter of the smooth walled portion of the cylinder, whereby the ring and diaphragm assembly may during assembling of the shock absorber be slid as a unit into the open end of said cylinder member to its proper position adjacent the closed end of the cylinder member, and a radially inwardly projecting annular abutment on the inner wall of the cylinder above said point of positioning of said diaphragm serving to stop the inward application of said diaphargm and ring assembly and to square up the assembly and determine its position for operation.

2. The shock absorber as set forth in claim 1 in which said ring is an annulus of sheet material having its margins rolled to form return-bent flanges.

References Cited in the file of this patent
UNITED STATES PATENTS

| | | |
|---|---|---|
| 1,023,814 | Christenson | Apr. 23, 1912 |
| 2,343,320 | Parker | May 7, 1944 |
| 2,532,143 | Breit | Nov. 28, 1950 |
| 2,532,620 | Higgs | Dec. 5, 1950 |
| 2,849,026 | Tulpin | Aug. 26, 1958 |
| 2,914,089 | Allinquant | Nov. 24, 1959 |
| 2,962,612 | Lung | Nov. 29, 1960 |
| 3,020,981 | Day | Feb. 13, 1962 |
| 3,035,614 | Kirk | May 22, 1962 |
| 3,038,501 | Greer | June 12, 1962 |

FOREIGN PATENTS

| | | |
|---|---|---|
| 154,662 | Australia | June 26, 1952 |
| 478,591 | Great Britain | Jan. 30, 1938 |
| 571,906 | Italy | Jan. 16, 1958 |
| 623,257 | Germany | Dec. 20, 1935 |